(12) United States Patent
Tsotsis

(10) Patent No.: US 9,707,724 B2
(45) Date of Patent: Jul. 18, 2017

(54) METHODS AND APPARATUS ASSOCIATED WITH NARROW TOWS FABRICATED FROM LARGE-TOW PREFORMS

(75) Inventor: Thomas K. Tsotsis, Orange, CA (US)

(73) Assignee: The Boeing Company, Chicago, IL (US)

( * ) Notice: Subject to any disclaimer, the term of this patent is extended or adjusted under 35 U.S.C. 154(b) by 1478 days.

(21) Appl. No.: 12/165,775

(22) Filed: Jul. 1, 2008

(65) Prior Publication Data

US 2010/0003881 A1 Jan. 7, 2010

(51) Int. Cl.
| | |
|---|---|
| *B29C 70/20* | (2006.01) |
| *D02J 1/18* | (2006.01) |
| *D04H 1/54* | (2012.01) |
| *B29B 15/12* | (2006.01) |

(52) U.S. Cl.
CPC ............. *B29C 70/20* (2013.01); *B29B 15/12* (2013.01); *D02J 1/18* (2013.01); *D04H 1/54* (2013.01); *Y10T 442/60* (2015.04)

(58) Field of Classification Search
CPC ...................................... B29C 70/20
USPC .................................. 264/319, 324
See application file for complete search history.

(56) References Cited

U.S. PATENT DOCUMENTS

| | | | | |
|---|---|---|---|---|
| 5,094,883 A | * | 3/1992 | Muzzy ................... | B29C 70/50 264/131 |
| 5,472,553 A | | 12/1995 | Roberts | |
| 5,651,850 A | | 7/1997 | Turner et al. | |
| 5,705,795 A | | 1/1998 | Anderson et al. | |
| 5,717,191 A | | 2/1998 | Christensen et al. | |
| 5,756,973 A | | 5/1998 | Kirkwood et al. | |
| 5,760,379 A | | 6/1998 | Matsen et al. | |
| 5,786,576 A | | 7/1998 | Lunden | |
| 5,902,935 A | | 5/1999 | Georgeson et al. | |
| 6,521,152 B1 | | 2/2003 | Wood et al. | |
| 6,585,842 B1 | * | 7/2003 | Bompard et al. ............. | 156/166 |
| 6,602,810 B1 | | 8/2003 | Christensen et al. | |
| 6,613,169 B2 | | 9/2003 | Georgeson et al. | |
| 6,748,791 B1 | | 6/2004 | Georgeson et al. | |
| 7,234,571 B2 | | 6/2007 | Wood et al. | |
| 7,318,717 B2 | | 1/2008 | Wood et al. | |
| 2005/0023731 A1 | * | 2/2005 | Kondo et al. ................. | 264/324 |
| 2005/0257887 A1 | * | 11/2005 | Tsotsis ....................... | 156/308.2 |

FOREIGN PATENT DOCUMENTS

EP        1 125 728 A1 *  8/2001

* cited by examiner

*Primary Examiner* — Matthew Daniels
*Assistant Examiner* — Patrick Butler
(74) *Attorney, Agent, or Firm* — Armstrong Teasdale LLP

(57) ABSTRACT

A method for using a tow incorporating a large number of fibers to form a composite part that has the quality of parts made with tows incorporating a small number of fibers is described. The method includes spreading the tows incorporating a large number of fibers to form a relatively wide, flat, and continuous, unidirectional fabric, holding the fabric under tension to maintain the orientation and flatness, subjecting the flattened fabric to melt-bonding while held under tension to maintain the flattened configuration, and slicing the melt-bonded, unidirectional fabric into a plurality of narrow fiber tows and subsequently using these to produce braided, woven, and other fabric forms.

15 Claims, 3 Drawing Sheets

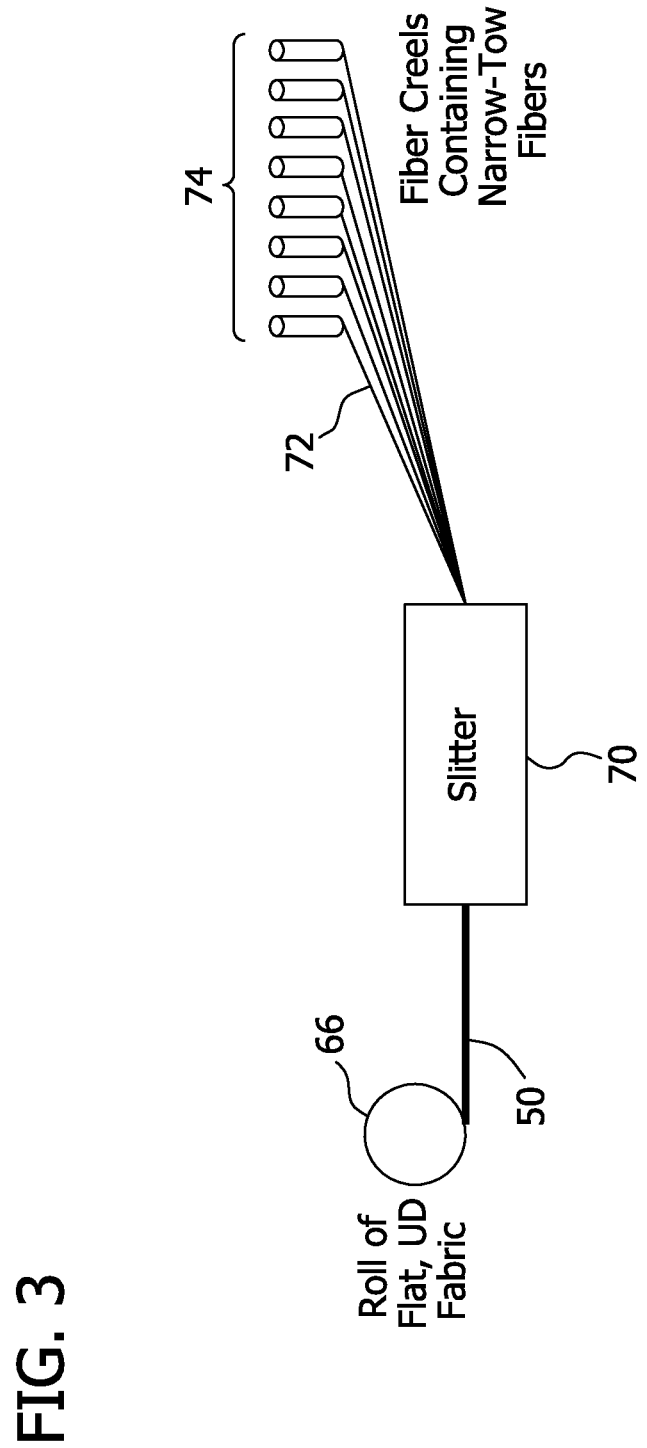

METHODS AND APPARATUS ASSOCIATED WITH NARROW TOWS FABRICATED FROM LARGE-TOW PREFORMS

BACKGROUND OF THE INVENTION

The field of the invention relates generally to preforms for composites, and more specifically to methods and apparatus associated with narrow tows fabricated from wide, unidirectional, large-tow-based preforms that incorporate a large number of fibers.

Fiber-reinforced composite structures are sometimes produced utilizing preforms. A preform is generally prepared by building up successive layers of carbon-fiber fabric. Strands of continuous filaments, which are sometimes referred to as tows, of carbon fiber may be woven into a two- or three-dimensional fabric, braided into a two- or three-dimensional fabric form, or combined in other fashions. The fabric produced in this fashion may then be assembled into a near-net shape and then infused with resin and cured in situ in a mold under heat and pressure to form a part.

It is desired to utilize low-cost preforms in the manufacture of composite structures. However, these generally entail the use of fiber tows having a large number of fibers therein. When these tows that incorporate a large number of fibers, or large fiber tows, are used, the resulting fabric quality is often below the fabric quality of a fabric made using similar forms and fiber tows that are fabricated with a lesser number of carbon fibers therein (smaller fiber tows), even though these fabrics require a corresponding increase in the number of these smaller fiber tows used in the construction of the fabric.

This problem is compounded when braids or woven fabrics are being fabricated. The use of large fiber tows in braids leads to large interstitial spaces between tows that become resin-rich pockets after infusion with resin. These resin-rich pockets are prone to the development of undesired microcracks. The woven fabrics fabricated using large fiber tows often have problems during handling because there is a relatively small number of fiber overlaps between the individual large fiber tows as compared to fabrics that incorporate smaller-fiber tows in the fabrics.

However, utilization of small fiber-based tow fabrics (tows that incorporate fewer fibers) in the fabrication of composite materials is far more expensive than utilization of tows incorporating a large number of fibers. This counterintuitive expense is at least partially based on the capacity of the machines utilized in the fabrication of carbon-fiber tows. Generally, the fabrication of a 24K tow, containing 24,000 carbon fibers, polyacrylonitrile (PAN) tows, also containing 24,000 filaments, are passed through a series of high-temperature ovens in which the PAN is carburized to carbon to form tows with an identical (here 24,000) number of filaments as the PAN precursor. To fabricate a 1K tow, an identical process is used, but PAN tows that contain only 1,000 filaments are used as the precursor. Typically, the carburization apparatus used to convert PAN to carbon can handle a fixed number of tows and the linear rate of conversion (meters/minute, for example) is essentially identical irrespective of the size of the precursor tow (e.g. 1K vs. 24K). For example, twenty-four 1K PAN precursor tows would be needed to yield an equivalent amount of carbon per hour that could be fabricated with one 24K PAN tow. In this very simple example, the fabrication process is running at $\frac{1}{24}$ of the efficiency when fabricating 1K tows, which is one reason that 1K tows are generally much more expensive than 24K tows.

BRIEF DESCRIPTION OF THE INVENTION

In one aspect, a method for using a tow incorporating a large number of fibers to form a composite part that has the quality of parts made with tows incorporating a small number of fibers is provided. The method includes spreading the tows incorporating a large number of fibers to form a relatively wide, flat, and continuous, unidirectional fabric, holding the fabric under tension to maintain the orientation and flatness, subjecting the flattened fabric to a melt-bonding process while held under tension to maintain the flattened configuration, and slicing the melt-bonded, unidirectional fabric into a plurality of narrow fiber tows.

In another aspect, a composite structure is provided. The composite structure includes a plurality of narrow fiber tows fabricated through the slitting of a flattened fabric fabricated from a tow incorporating a large number of fibers, the flattened fabric having been subjected to a melt-bonding process to maintain the flattened configuration.

In still another aspect, a method for reducing an interstitial spacing between the braids of the tows in a composite structure is provided. The method includes fabricating a plurality of narrow fiber tows from a tow incorporating a large number of fibers that has been flattened and stabilized and forming weaves and/or braids utilizing the narrow fiber tows.

BRIEF DESCRIPTION OF THE DRAWINGS

FIG. 3 is a representation of a process for fabricating narrow fiber tow from fiber tow incorporating a large number of fibers.

DETAILED DESCRIPTION OF THE INVENTION

The described embodiments are related to the obtaining of small-fiber-equivalent stabilized tows through the slitting of melt-bond-stabilized, unidirectional fabrics made from tow performs that incorporate a large number of fibers (large fiber tows), and the implementation of these slit, narrow unidirectional fabrics, which are sometimes referred to herein as narrow tows, into woven or braided fabrics using conventional techniques. Generally, the fibers utilized are carbon fibers though the described processes are applicable to other fiber types. In other words, low-cost equivalents to small fiber tows are provided using large-fiber-tows, and the resulting narrow tows are subsequently utilized to form woven or braided fabrics with small interstitial spaces. Such small interstitial spaces are less susceptible to microcracking than with similar fabric performs fabricated from large fiber tows. In one embodiment, the melt-bonding material is retained to impart toughness or may be fugitive after integration into the weave or braid as needed. For example, initial large tow sizes such as 12K, 24K, or 48K may be used to make flat sheets that have been stabilized by a melt-bondable fabric and that are suitable for slitting. These flat sheets may then be slit into widths that are equivalent to small tow sizes such as 1K and 3K. The exact width will be dependent on the type of fiber used as filament diameters are different for different types of fibers. For example, standard-modulus (SM) carbon fibers typically have diameters that are approximately seven (7) micrometers and intermediatemodulus (IM) carbon fibers have diameters closer to five (5) micrometers. As is easily understood, fiber tows with 12,000 filaments of SM fibers are significantly wider than those made from IM fibers, for the reasons given above.

Figure 1:
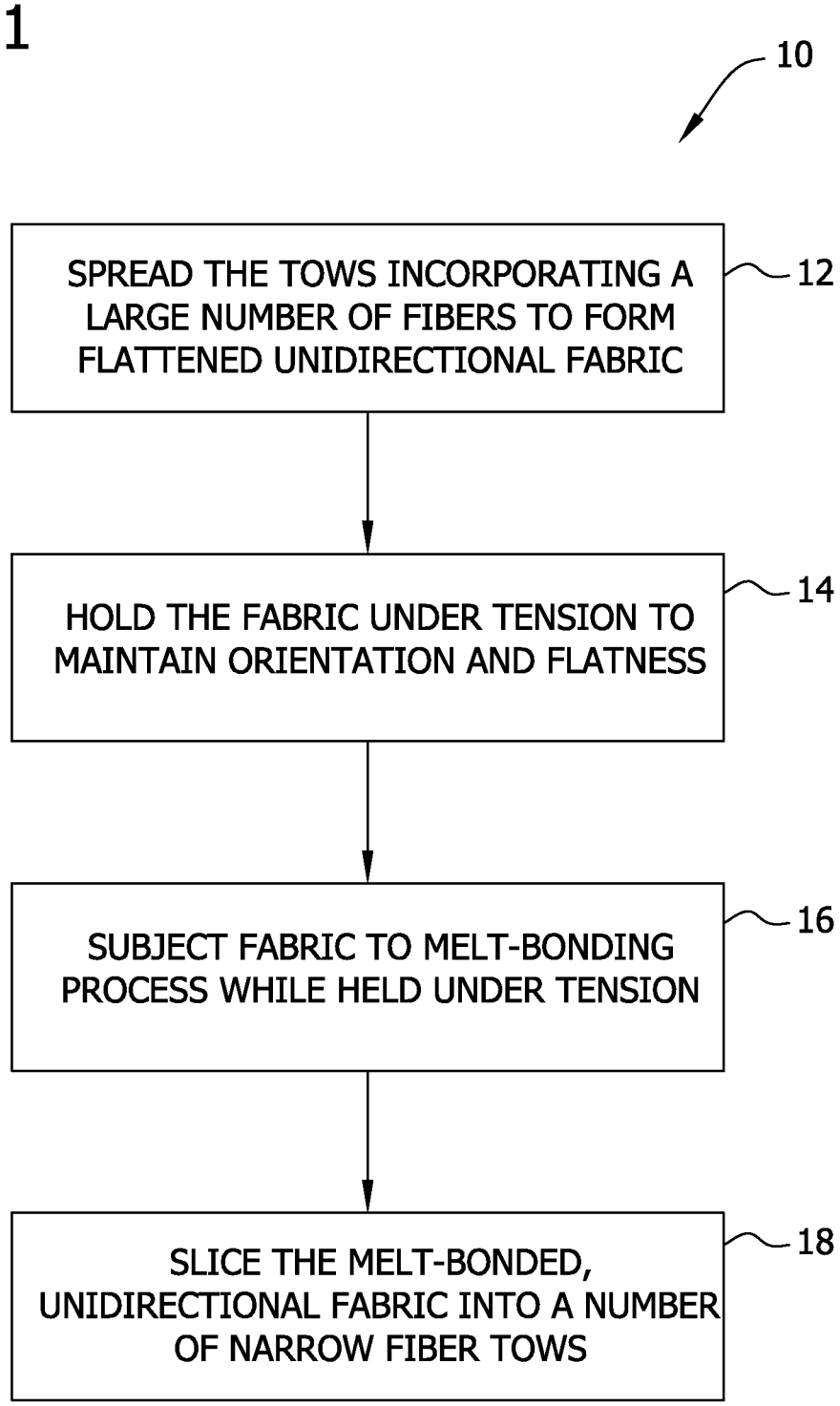
FIG. 1 is a flowchart that illustrates a method of manufacturing individual fiber tows from a fiber tow sheet.

FIG. 1 is a flowchart 10 that illustrates a method of manufacturing multiple narrow tows from a sheet fabricated utilizing a single large fiber tow. The method includes spreading 12 the tows incorporating a large number of fibers to form a relatively wide, flat, and continuous, unidirectional fabric, holding 14 the fabric under tension to maintain the orientation and flatness, subjecting 16 the flattened fabric to a melt-bonding process while held under tension to maintain and stabilize the flattened configuration, and slicing 18 the unidirectional fabric into a plurality of narrow fiber tows. Fabricating the flattened sheet from the large fiber tow includes arranging the large fiber tow so it is positioned substantially flat, with the respective fibers adjacent to one another, before the melt-bonding or other stabilizing process is initiated.

Figure 2:
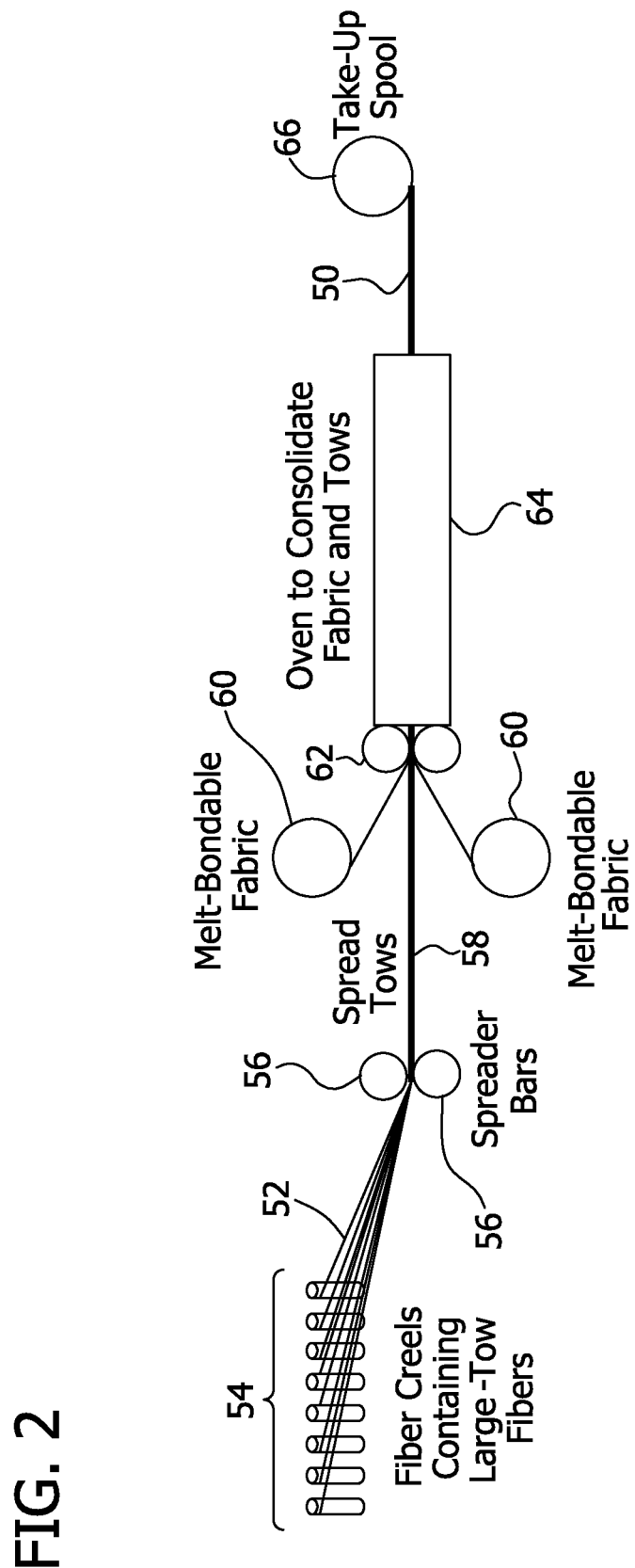
FIG. 2 is a representation of a fabrication process for large fiber tow.

FIG. 2 is a representation of a fabrication process for large fiber tow 50, which in one embodiment, is in the form of a unidirectional, fibrous fabric. Large fiber tow 50 is fabricated from a plurality of large tow fibers 52 drawn from respective fiber creels 54. The large tow fibers 52 are drawn through spreader bars 56 resulting in flattened, or spread tows 58. Melt-bondable fabric 60 is added to both a bottom and a top of the spread tows 58, and the combination passed through a second set of roller bars 62 to maintain the flattened configuration of the spread tows 58 and melt-bondable fabric 60 as the combination passes through oven 64. Passing through oven 64 consolidates the spread tows 58 and melt-bondable fabric 60 into the large fiber tow 50 which is gathered onto a take up spool 66. The groups of fibers that make up spread tows 58 are stabilized, in one embodiment, via melt-bonding with a thermoplastic fabric or other thermoplastic material(s), represented in FIG. 2 by melt-bondable fabric 60. Each instance of large tow fibers 52 represents, for example, a number of (e.g., 1000) adjacent and substantially parallel fibers. One specific example of large fiber tow 50 may include 24,000 individual fibers, and therefore the spread tows 58, and ultimately, the unidirectional fabric that constitutes large fiber tow 50, may sometimes be referred to as a 24K fiber tow. The unidirectional fabric 50 is spread out to become substantially flat, as depicted in FIG. 2, and therefore each potential narrow tow that can be fabricated therefrom, as described with respect to FIG. 3, is also substantially flat.

In various embodiments, fabric 50 may be a thermoplastic fabric and preferably a non-woven fabric, but in alternative embodiments, the thermoplastic fabric may be a woven fabric, a melt-blown fabric, or other type of thermoplastic fabric. More specifically, and as mentioned above, the melt-bondable fabric is a thermoplastic that is applied to the flattened fabric made up of the spread tows 58. In at least one embodiment, the thermoplastic is compatible with a matrix resin, and as such any resulting composite structures are strengthened. In one additional embodiment, the thermoplastic material is selected to have an area density of between about one and about 50 grams/square meter.

In various alternative embodiments, the thermoplastic is one or more of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, and polyethylene terephthalate that has been melt-bonded to the flattened fabric.

According to one embodiment, and as illustrated in FIG. 3, the flattened and melt-bonded, unidirectional fibrous fabric that makes up large fiber tow 50, is dispensed from the take up spool 66 is slit or sliced into smaller widths using a slitter 70. This process results in flat, stabilized, continuous-fiber tows, referred to herein as narrow fiber tows 72, that are suitable for weaving, braiding, or other fabric-forming operation. From the slitter 70, the narrow fiber tows 72 are gathered onto a plurality of fiber creels 74. The narrow fiber tows 72 share many of the characteristics of the above-described small fiber tows, however, the narrow fiber tows 72 are less expensive to produce for the reasons provided above.

In one specific embodiment, the fabric 50 is slit such that each slice, or each narrow fiber tow 72, has a width that is substantially equivalent to a width associated with 1000 individual fibers, though other widths are contemplated. In another specific embodiment, the fabric that makes up large fiber tow 50 is slit into narrow fiber tows 72 having a specific width, such as ⅛-inch width, rather than a measurement that is based on the number of fibers in the resulting narrow tows. By either measure of width, the result is a plurality of continuous-length, fiber-tow pieces (e.g., narrow fiber tows 72) with dimensions (width, number of filaments, etc.) substantially lower than the tows used at the beginning of the process.

Whatever width of narrow fiber tow 72 is generated from the fibrous fabric of large fiber tow 50, the next step is to form weaves or braids from these narrow fiber tows 72 in the conventional manner. If desired, the melt-bonded material 60 or thermoplastic may be removed after weaving or braiding by the use of suitable solvents or heat. If heat treatment is used such that the fiber sizing is removed or degraded, conventional means for applying fiber finishes such as passing through a coating bath or dipping may be used to reconstitute any desired sizing.

The result of slicing the fibrous fabric of large fiber tow 50 of FIG. 2 into multiple narrow tows 72 is continuous, low-cost fibers that are suitable for weaving and braiding. Interstitial toughening via melt-bonding to can be imparted into resulting braided fabrics, which is not possible using currently existing methods via the melt-bonding thermoplastic. This melt-bond material may be fugitive, if undesired, after formation of woven or braided fabric.

The described embodiments allow for the fabrication of narrow fiber tow weaves and braids from low-cost materials (a large fiber tow) with no loss in performance. In certain cases, this fabrication method results in an improved performance due to smaller interstitial spaces between the braids of the narrow fiber tows. These smaller spaces reduce the tendency for microcracking. Additional improvements in performance are provided through interlayer toughening to a braided fabric from the melt-bonding thermoplastic. One current solution is to use commercially available small-fiber tows to reduce interstitial spacing between tows, but this solution is a high-cost solution. Currently, no method exists for introducing interlayer-based toughening into braided fabrics fabricated from large fiber tows. However, the above-described embodiments are lower in cost while still providing interlayer toughening to the braids.

The above-described embodiments include the use of large fiber tow 50, slit into the above-described narrow fiber tows 72, to form composite parts that have the quality of parts made from smaller fiber tows. The fiber tows 50 described herein are generally fabricated from carbon fibers, but other fiber types are contemplated. The large fiber tows 50 described herein are flattened, melt-bonded into a relatively wide fabric and then separated, by slitting the fabric, into narrower components, referred to herein as narrow fiber tows, resulting in a method of fabricating a composite structure. Flattening the large fiber tows includes arranging the individual fibers of the large fiber tow so they are positioned substantially flat, with the individual fibers substantially adjacent to one another and maintaining this positioning through a melt-bonding process before the material is slit, or sliced, into the multiple narrow tows. The resultant narrow fiber tows may then be utilized, in conjunction with appropriate tooling, in the formation of a composite part. Costs are reduced as the more-cost-efficient large-fiber tows are separated into multiple narrow fiber tows which allows users to maintain the quality of using small fiber tows without the increased cost of off-the-shelf small fiber tows.

The described embodiments provide methods for production of toughened, braided or woven products that result in an advantage to a manufacturer as the process results in lowers costs and possibly increased performance over contemporary, preformed composite structures. This benefit is imparted when the melt-bonding material use to hold the large fiber tows together is compatible with the matrix resin that is subsequently used to infuse a preform made from fabrics based on the above-described narrow tow fibers and then processed to form a composite part provided that the melt-bondable material and the matrix work together to suppress damage when the cured part is subjected to impact.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for using tows incorporating a large number of fibers to form a composite part that has the quality of parts made with tows incorporating a small number of fibers, said method comprising:
   spreading the tows incorporating a large number of fibers to form a relatively flat and continuous unidirectional fabric;
   holding the continuous unidirectional fabric under tension to maintain the orientation and flatness;
   applying a melt-bondable fabric to both a bottom and a top of the continuous unidirectional fabric;
   passing the continuous unidirectional fabric including the melt-bondable fabric on the bottom and top of the continuous unidirectional fabric through an oven;
   consolidating the melt-bondable fabric and the continuous unidirectional fabric in the oven while under tension;
   slicing the melt-bonded, unidirectional fabric into a plurality of narrow fiber tows;
   forming at least one of weaves and braids from at least some of the plurality of narrow fiber tows produced from slicing the melt-bonded, unidirectional fabric, thereby forming a woven or braided preform, wherein the woven or braided preform is dry and configured for subsequent infusion with a matrix resin.

2. A method according to claim 1 further comprising collecting melt-bonded fabric on a take-up roll in the form of a continuous, unidirectional fabric prior to slicing.

3. A method according to claim 1 further comprising collecting the narrow fiber tows on to individual spools suitable for subsequent processing.

4. A method according to claim 1 further comprising positioning multiple narrow fiber tows relative to one another to create a fabric.

5. A method according to claim 4 wherein positioning multiple narrow fiber tows relative to one another to create a fabric comprises arranging the narrow tows into at least one of a woven fabric and a braided fabric.

6. A method according to claim 1 wherein applying a melt-bondable fabric comprises applying a thermoplastic to the flattened fabric.

7. A method according to claim 6 wherein applying a thermoplastic to the flattened fabric comprises applying at least one of polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyetherketerketone, polyarylamide, polyketone, polyphthalamide, polyphenylenether, polybutylene terephthalate, and polyethylene terephthalate to the flattened fabric.

8. A method according to claim 1 wherein applying a melt-bondable fabric comprises applying a thermoplastic that is compatible with a matrix resin to the flattened fabric.

9. A method according to claim 6 wherein applying a thermoplastic to the flattened fabric comprises applying a thermoplastic material that has an area density of between about one and about 50 grams/square meter.

10. A method according to claim 1 wherein slicing the melt-bonded, unidirectional fabric into a plurality of narrow fiber tows comprises slicing the flattened sheet into tows that are substantially equivalent to a width associated with 1000 individual fibers.

11. A method according to claim 1 wherein slicing the melt-bonded, unidirectional fabric into a plurality of narrow fiber tows comprises slicing the flattened sheet into tows that have a width of approximately ⅛-inch in width.

12. A method according to claim 1 further comprising:
   removing melt-bonded thermoplastic from the at least one of weaves and braids.

13. A method according to claim 12 further comprising applying fiber finishes to reconstitute a desired sizing for the narrow fiber tows.

14. A method for reducing an interstitial spacing between tows in a composite structure, said method comprising:
   applying a melt-bondable fabric to both a bottom and a top of a continuous unidirectional fabric formed from a plurality of tows incorporating a large number of fibers;
   passing the continuous unidirectional fabric including the melt-bondable fabric on the bottom and top of the continuous unidirectional fabric through an oven;
   consolidating the melt-bondable fabric and the continuous unidirectional fabric in the oven;
   fabricating a plurality of narrow fiber tows from the consolidated melt-bondable fabric and continuous unidirectional fabric by slicing the consolidated melt-bondable fabric and continuous unidirectional fabric; and
   forming at least one of weaves and braids utilizing at least some of the narrow fiber tows produced from slicing the consolidated melt-bondable fabric and continuous unidirectional fabric, thereby forming a woven or braided preform, wherein the woven or braided preform is dry and configured for subsequent infusion with a matrix resin.

15. A method according to claim 14 further comprising spreading out the plurality of tows incorporating a large number of fibers to a substantially flat configuration to form the continuous unidirectional fabric.

\* \* \* \* \*